US009788344B2

(12) United States Patent
Sung et al.

(10) Patent No.: US 9,788,344 B2
(45) Date of Patent: Oct. 10, 2017

(54) SYSTEM AND METHOD FOR RANDOM ACCESS BASED ON SPATIAL GROUP

(71) Applicant: Korea Advanced Institute of Science and Technology, Daejeon (KR)

(72) Inventors: Dan Keun Sung, Daejeon (KR); Han Seung Jang, Daejeon (KR); Su Min Kim, Gyeongsangnam-do (KR); Kab Seok Ko, Daejeon (KR); Ji Young Cha, Daejeon (KR)

(73) Assignee: KOREA ADVANCED INSTITUTE OF SCIENCE AND TECHNOLOGY (KR)

( * ) Notice: Subject to any disclaimer, the term of this patent is extended or adjusted under 35 U.S.C. 154(b) by 290 days.

(21) Appl. No.: 14/489,285

(22) Filed: Sep. 17, 2014

(65) Prior Publication Data

US 2015/0305062 A1 Oct. 22, 2015

(30) Foreign Application Priority Data

Apr. 18, 2014 (KR) .................. 10-2014-0046495
May 23, 2014 (KR) .................. 10-2014-0062211

(51) Int. Cl.
*H04W 74/00* (2009.01)

(52) U.S. Cl.
CPC ................. *H04W 74/002* (2013.01)

(58) Field of Classification Search
None
See application file for complete search history.

(56) References Cited

U.S. PATENT DOCUMENTS

| 2009/0073944 | A1* | 3/2009 | Jiang | .............. H04J 11/00 370/338 |
| 2010/0279707 | A1 | 11/2010 | Fischer et al. | .......... 455/456.1 |
| 2011/0007825 | A1* | 1/2011 | Hao | .............. H04J 13/0062 375/259 |
| 2011/0188598 | A1* | 8/2011 | Lee | .............. H04B 7/0452 375/267 |
| 2013/0195081 | A1* | 8/2013 | Merlin | .............. H04W 74/002 370/336 |
| 2013/0258956 | A1* | 10/2013 | Dinan | .............. H04W 56/001 370/329 |

(Continued)

FOREIGN PATENT DOCUMENTS

KR 10-2011-0082056 7/2011 .............. G01S 5/10

OTHER PUBLICATIONS

Official Action issued in corresponding Korean Patent Appln. Serial No. 10-2014-006221 dated Jul. 20, 2015, with translation (7 pgs).

(Continued)

*Primary Examiner* — Chirag Shah
*Assistant Examiner* — Suk Jin Kang
(74) *Attorney, Agent, or Firm* — Hayes Soloway P.C.

(57) ABSTRACT

Provided is a random access method of a node, the method including receiving spatial group information on spatial groups generated in a cell from a base station, identifying a spatial group corresponding to the node based on the spatial group information, transmitting a preamble signal to the base station by generating the preamble signal, and receiving a random access response message in response to the preamble signal.

16 Claims, 12 Drawing Sheets

(56) References Cited

U.S. PATENT DOCUMENTS

| | | | | |
|---|---|---|---|---|
| 2013/0265991 A1* | 10/2013 | Dinan | H04W 56/0005 | 370/336 |
| 2013/0329680 A1* | 12/2013 | Lee | H04B 7/0452 | 370/329 |
| 2014/0079011 A1* | 3/2014 | Wiberg | H04W 74/006 | 370/329 |
| 2014/0136545 A1* | 5/2014 | Calo | G06F 17/30327 | 707/743 |
| 2014/0219109 A1* | 8/2014 | Shukair | H04W 56/0045 | 370/252 |
| 2014/0247824 A1* | 9/2014 | Sohn | H04W 74/002 | 370/338 |
| 2014/0301330 A1* | 10/2014 | Lee | H04W 74/0833 | 370/329 |
| 2014/0328235 A1* | 11/2014 | Merlin | H04B 7/2621 | 370/311 |
| 2014/0328236 A1* | 11/2014 | Merlin | H04B 7/2621 | 370/311 |
| 2014/0348258 A1* | 11/2014 | Walton | H04B 7/022 | 375/267 |
| 2014/0369297 A1* | 12/2014 | Bertrand | H04W 74/002 | 370/329 |
| 2015/0016312 A1* | 1/2015 | Li | H04W 74/0833 | 370/280 |
| 2015/0016352 A1* | 1/2015 | Bressanelli | H04W 74/0833 | 370/329 |
| 2015/0036674 A1* | 2/2015 | Lee | H04B 7/0452 | 370/338 |
| 2015/0049730 A1* | 2/2015 | Merlin | H04W 74/002 | 370/329 |
| 2015/0180560 A1* | 6/2015 | Van Nee | H04B 7/0434 | 370/329 |
| 2015/0373656 A1* | 12/2015 | Kim | H04W 56/002 | 370/350 |
| 2016/0007377 A1* | 1/2016 | Frenne | H04W 56/001 | 370/329 |
| 2016/0242147 A1* | 8/2016 | Tarlazzi | H04W 72/04 | |

OTHER PUBLICATIONS

"HANSA" Maintenance Ginde (13 pgs).

Meeting Agenda, QUALCOMM Europe, dated Aug. 20-24, 2007 (4 pgs).

Ko, Kab Seok et al., "A Novel Random Access for Fixed-Location Machine-to-Machine Communications in OFDMA Based Systems" *IEEE Communications Letters*, vol. 16, No. 9, Sep. 2012, pp. 1428-1431 (4 pgs).

* cited by examiner

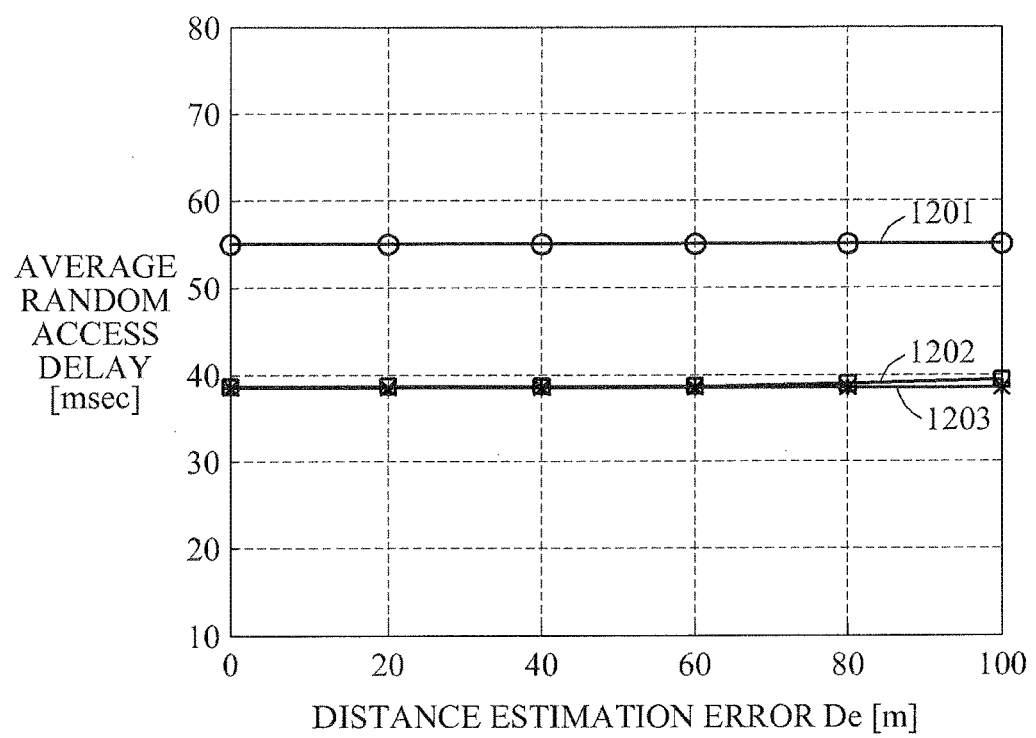

SYSTEM AND METHOD FOR RANDOM ACCESS BASED ON SPATIAL GROUP

CROSS-REFERENCE TO RELATED APPLICATION

This application claims the priority benefit of Korean Patent Application No. 10-2014-0046495, filed on Apr. 18, 2014, and Korean Patent Application No. 10-2014-0062211, filed on May 23, 2014, in the Korean Intellectual Property Office, the disclosures of which are incorporated herein by reference.

BACKGROUND

1. Field of the Invention

The present invention relates to random access technology in an orthogonal frequency division multiple access (OFDMA) based cellular system.

2. Description of the Related Art

Resources are shared in wireless communication systems through all resources such as a frequency bandwidth and a transmission time slot being divided into several segments using a multiple access method, for example, time division multiple access (TDMA), frequency division multiple access (FDMA), and code division multiple access (CDMA), and performing scheduling based on requirements by a user. For more effective use of the resources, a random access method through which all nodes have transmission rights and randomly transmit data may be used by a plurality of nodes as a method of transmitting sporadic data through an uplink common channel.

One random access method includes transmitting a preamble generated using a code randomly selected by a node to a base station and transmitting data for actual random access after receiving a response to the preamble from the base station. In such a method of transmitting the data for the random access, the preamble and the data may be transmitted through a common random access channel and additional resource allocation may be required, irrespective of a random access request by the node.

In a future cellular network, machine-to-machine (M2M) communication may gain an added attention and become further diversified. As the M2M communication applications are further diversified, the number of nodes may drastically increase. Thus, a base station and a network may experience overload that may be caused by a multitude of random access requests from numerous nodes. Hence, an orthogonal frequency division multiple access (OFDMA) based cellular system may need to accommodate a greater number of nodes in a cell and require sufficient random access resources to accept the random access requests from the nodes. In a third generation partnership project (3GPP) long term evolution (LTE) system of the OFDMA based cellular system, the number of preambles used for a conventional random access method is limited to 64. However, when numerous nodes attempt random access with the limited 64 preambles, random access collision probability and random access delay may increase and thus, quality of service (QoS) may not be satisfied. Accordingly, there is a desire for new technology for generating a greater number of preambles with a fixed preamble identification bit number in an existing random access response message and physical random access channels to accommodate a greater number of nodes.

SUMMARY

An aspect of the present invention provides a method of forming multiple spatial groups by grouping the coverage area of a cell to generate a greater number of preambles.

Another aspect of the present invention also provides a random access method to reduce the random access collision probability and random access delay while using the conventionally used number of root indices and the conventionally used number of preamble identifier bits in the random access response message.

According to an aspect of the present invention, there is provided a random access method of a node, the method including receiving spatial group information on spatial groups in a cell generated from a base station, identifying a spatial group corresponding to the node based on the spatial group information, transmitting a preamble signal to the base station by generating the preamble signal, and receiving a random access response message in response to the preamble signal.

The spatial groups in the cell may be generated based on the distance from the base station of the cell.

The identificating of the spatial group corresponding to the node may include receiving the reference signal transmitted from the base station of the cell, estimating the distance from the base station to the node based on the strength of reference signal, and identifying information on the spatial group corresponding to the node from the spatial group information received from the base station.

The generating of the preamble signal may include determining a cyclic shift using a group coverage distance of the spatial group, and generating the preamble signal using a root index allocated to the spatial group and the cyclic shift.

The receiving of the random access response message may include searching for a random access response message corresponding to the node based on the preamble identifier and timing alignment information included in the random access response message.

The searching for the random access response message may include searching for the random access response message in which the timing alignment information corresponds to the range of timing alignment information for the spatial group.

According to another aspect of the present invention, there is provided a random access method of a base station, the method including forming spatial groups in the cell of the base station, transmitting spatial group information on the formed spatial groups to a node, receiving preamble signal from the node, and transmitting a random access response message in response to the preamble signal.

The forming of the spatial groups in the cell may include forming the spatial groups based on the distance from the base station.

The forming of the spatial groups in the cell may include determining the number of the spatial groups to be identical to the number of available root indices for the base station, and setting the group coverage distance of a spatial group to minimize the random access collision probabilities of nodes included in the spatial group and uniformly maintain the collision probabilities among the spatial groups.

The spatial group information may include a group coverage distance and a root index of the spatial group.

According to still another aspect of the present invention, there is provided a node performing a random access method, the node including a group information receiver to receive spatial group information on spatial groups in a cell formed from a base station, an identifier to identify a spatial group corresponding to the node, a preamble generator to generate a preamble signal, a transmitter to transmit the generated preamble signal to the base station, and a searcher to search for an available random access response message in response to the preamble signal.

The identifier may identify information on a spatial group corresponding to the node from the spatial group information received from the base station by receiving the reference signal transmitted from the base station of the cell and estimating the distance from the base station to the node based on the strength of the reference signal.

The preamble generator may generate the preamble signal by determining a cyclic shift using a group coverage distance of the spatial group and by using a root index allocated to the spatial group and the cyclic shift.

The searcher may search for a random access response message corresponding to the node using a preamble identifier and timing alignment information included in the random access response message.

According to yet another aspect of the present invention, there is provided a base station performing a random access method with a node, the base station including a spatial group former to form spatial groups in the cell of the base station, a spatial group information transmitter to transmit spatial group information on the formed spatial groups to the node, a receiver to receive a preamble signal from the node, and a random access response message transmitter to transmit a random access response message in response to the preamble signal.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIGS. 11 and 12 are graphs illustrating the effect obtained through spatial group based random access when the distance estimation error is varied according to an embodiment of the present invention.

DETAILED DESCRIPTION

Figure 1:
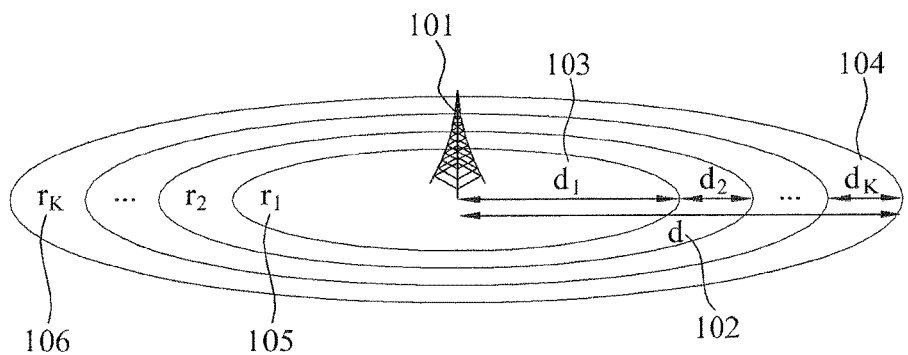
FIG. 1 is a diagram illustrating a spatial group based random access method according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the accompanying drawings, however, the present invention is not limited thereto or restricted thereby.

When it is determined a detailed description related to a related known function or configuration that may make the purpose of the present invention unnecessarily ambiguous in describing the present invention, the detailed description will be omitted here. Also, terms used herein are defined to appropriately describe the exemplary embodiments of the present invention and thus may be changed depending on a user, the intent of an operator, or a custom. Accordingly, the terms must be defined based on the following overall description of this specification.

Transmitting a variety of data through, for example, time, space, and frequency domain resources, may be necessary to implement various transmission or reception methods for high-speed packet transmission. Similarly, transmitting random access preambles may be necessary to perform a random access procedure. To transmit such a random access preamble or uplink control information, sequences are widely used. A sequence may be transmitted independently in the form of a spreading code, a terminal identifier, and a signature, or along with control information through a control channel or a random access channel.

In the third generation partnership project (3GPP) long-term evolution (LTE) system of an orthogonal frequency division multiple access (OFDMA) based cellular system, a preamble may be formed using a Zadoff-Chu (ZC) sequence. the preamble signal may refer to a signal used to match synchronizations of two systems in data communication. In the LTE system, the ZC sequence may be used to generate a random access preamble for a reference signal used for channel estimation, a primary synchronization signal (PSS)/secondary synchronization signal (SSS) for synchronization, and initial network access. The random access procedure may be performed when a terminal initially accesses a base station in uplink, and is used to request allocation of resources required to transmit data from the terminal to the base station. In such an example, the ZC sequence may be defined as Equation 1.

$$z_r[n] = \left[ -j \frac{\pi \times r \times n \times (n+1)}{N_{ZC}} \right], n = 0, 1, \ldots N_{ZC} - 1 \qquad \text{[Equation 1]}$$

In Equation 1, $N_{ZC}$ denotes the ZC sequence length and $r \in \{1, 2, \ldots N_{ZC}-1\}$ denotes a root index. In principle, multiple random access preambles may be generated from the ZC sequence by cyclically shifting the ZC sequence by an integer multiple of $N_{CS}$, which is a cyclic shift. A sequence obtained by cyclically shifting $N_{CS}$ by a multiple of "i" is $z_{r,i}[n]=z_r[(n+N_{CS} \times i) \bmod N_{ZC}]$, which is referred to as the i-th preamble. The number of available preambles per root index (ZC sequence) is $$\left\lfloor \frac{N_{ZC}}{N_{CS}} \right\rfloor,$$

and depends on a value of $N_{CS}$. The value of $N_{CS}$, indicating the cyclic shift, may be determined by a cell radius "d," and set to compensate for a value greater than or equal to a total of maximum round-trip delay and maximum delay spread between a base station and a terminal located on the cell boundary in order to obtain the round-trip delay between the base station and a non-synchronized terminal located within the cell coverage region based on the time instance at which a preamble is received and to successfully detect the preamble in a predetermined preamble detection zone. A lower bound of $N_{CS}$ to which the requirements are reflected may be represented as Equation 2.

$$N_{CS} \geq \left\lceil \left(\frac{20}{3}d + \tau_{ds}\right)\frac{N_{ZC}}{T_{SEQ}} \right\rceil + n_g \quad \text{[Equation 2]}$$

In Equation 2, d denotes the cell radius in kilometers (km). $\tau_{ds}$ denotes the maximum delay spread in μs. $N_{ZC}$ and $T_{SEQ}$ denote the ZC sequence length and duration (μs), respectively. $n_g$ denotes the number of additional guard samples. $\lceil x \rceil$ is the ceiling function. The function of a cyclic shift depending on d may be defined as Equation 3 with a lower bound of Equation 2.

$$N_{CS}(d) = \left\lceil \left(\frac{20}{3}d + \tau_{ds}\right)\frac{N_{ZC}}{T_{SEQ}} \right\rceil + n_g \quad \text{[Equation 3]}$$

In addition, the number of available preambles that may be generated per root index (ZC sequence) may be derived as a function based on d as represented by Equation 4.

$$N_{PA}(d) = \left\lfloor \frac{N_{ZC}}{N_{CS}(d)} \right\rfloor \quad \text{[Equation 4]}$$

In Equation 4, $N_{CS}(d)$ may increase as d increases, and the number $N_{PA}(d)$ of available preambles that may be generated per root index (ZC sequence) may decrease. $\lfloor x \rfloor$ is the floor function.

In the conventional random access method, fixed $N_{PA}^{conv}$ number of preambles in a cell are required to be provided. In the 3GPP LTE system, $N_{PA}^{conv}$ is set to be 64. When $N_{PA}(d)$, indicating the number of available preambles that may be generated per root index based on d, is less than $N_{PA}^{conv}$, at least two root indices (ZC sequence) may be used to provide a total of $N_{PA}^{conv}$ preambles. the required number "K" of root indices for generating the fixed number $N_{PA}^{conv}$ of preambles in the conventional random access method is obtained as Equation 5.

$$K = \left\lceil \frac{N_{PA}^{CONV}}{N_{PA}(d)} \right\rceil \quad \text{[Equation 5]}$$

Detailed descriptions will be provided hereinafter with reference to accompanying drawings.

FIG. 1 is a diagram illustrating a spatial group based random access method according to an embodiment of the present invention.

FIG. 1 illustrates a cell model 100 in spatial group based random access. Referring to FIG. 1, the cell radius in the coverage area to which a service of a base station 101 is provided is "d" 102. In the example of FIG. 1, the required number "K" of root indices based on the d 102 may be determined using Equations 3, 4, and 5 provided in the foregoing. K root indices, for example, $r_1, r_2, \ldots, r_K$, may be used within a cell to which the service of the base station 101 is provided. The d 102 may be divided into K group coverage distances, for example, $d_1$ 103, $d_2, \ldots, d_K$ 104, in which "K" is identical to the required number K of root indices. Thus, spatial groups having the group coverage distances $d_1$ 103, $d_2, \ldots, d_K$ 104 may be formed. For example, the first group may be formed as a round-shaped spatial group with the group coverage distance "$d_1$" 103. In such an example, only a root index "$r_1$" 105 among the K root indices may be used to generate preambles, and a cyclic shift may be determined by substituting the $d_1$ 103, in lieu of the d 102, in Equation 3. Thus, the first group may generate and use $$N_{PA}(d_1) = \left\lfloor \frac{N_{ZC}}{N_{CS}(d_1)} \right\rfloor$$

preambles.

$$\cdot N_{PA}(d_k) = \left\lfloor \frac{N_{ZC}}{N_{CS}(d_k)} \right\rfloor > N_{PA}(d) = \left\lfloor \frac{N_{ZC}}{N_{CS}(d)} \right\rfloor, \quad \text{[Equation 6]}$$
$$k = 1, 2, \ldots, K$$

the remaining groups may be formed as doughnut-shaped spatial groups and generate preambles based on the respective group coverage distances and root indices using the same method applied to the first group.

the K-th group, which is the last group, may have a group coverage distance of "$d_K$" 104 and root index "$r_K$" 106 to generate and use $$N_{PA}(d_K) = \left\lfloor \frac{N_{ZC}}{N_{CS}(d_K)} \right\rfloor$$

preambles.

Figure 2:
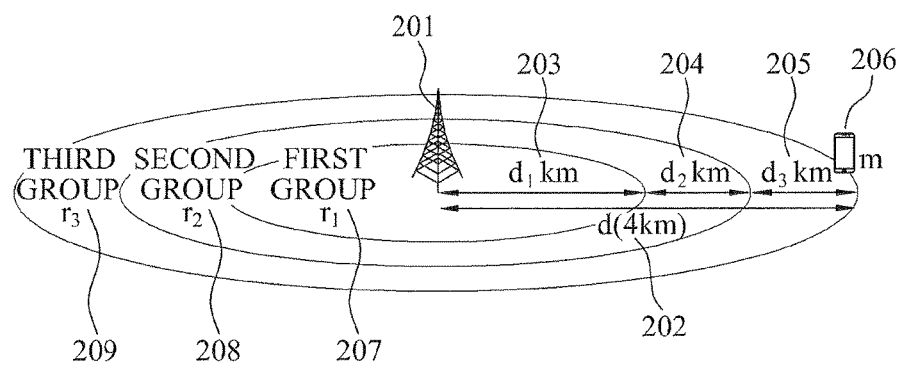
FIG. 2 is a diagram illustrating a method of identifying a spatial group of a node and generating a preamble in the spatial group based random access method according to an embodiment of the present invention.

FIG. 2 is a diagram illustrating a method of identifying the spatial group of a node 206 and generating a preamble in the spatial group based random access method according to an embodiment of the present invention.

FIG. 2 illustrates an example 200 in which a cell radius "d" 202 is 4 kilometers (km). A base station 201 may determine the number "K" of root indices and a total number "K" of spatial groups to be 3 based on the d 202 of 4 km using Equations 3, 4, and 5. The d 202 of 4 km may be divided into the first group, the second group, and the third group based on the respective group coverage distances, $d_1$ 203, $d_2$ 204, and $d_3$ 205. In the example 200 of FIG. 2, the group coverage distances $d_1$ 203, $d_2$ 204, and $d_3$ 205 are assumed to be 2.0 km, 1.1 km, and 0.9 km, respectively. The base station 201 may allocate root indices $r_1$ 207, $r_2$ 208, and $r_3$ 209 to the first group, the second group, and the third group, respectively. The base station 201 may broadcast, to all nodes in a cell, the fixed group coverage distances $d_1$ 203, $d_2$ 204, and $d_3$ 205, and information on the root indices $r_1$ 207, $r_2$ 208, and $r_3$ 209. In such an example, the node 206 may be a terminal device or a communication processor.

According to an embodiment, the node 206 may estimate the distance from the base station 201 based on the strength of the reference signal transmitted from the base station 201. The node 206 may recognize that the node 206 is located approximately 4 km away from the base station 201 through distance estimation. The node 206 may be informed of the group coverage distances $d_1$ 203, $d_2$ 204, and $d_3$ 205, and the information on the root indices $r_1$ 207, $r_2$ 208, and $r_3$ 209 by receiving spatial group information transmitted from the base station 201. The node 206 may recognize that the node 206 belongs to the third group based on the group coverage distances, for example, $d_1+d_2=3.1$ km<4 km=$d_1+d_2+d_3$. In other words, the node 206 estimates the distance from the base station 201 based on the strength of the reference signal transmitted from the base station 201, and identifies the spatial group to which the node 206 belongs based on the estimated distance and the received spatial group information. In an example, the distance from the base station 201 to the node 206 may be obtained using a global positioning system (GPS). In another example, the distance from the base station 201 to the node 206 may be obtained using distance information pre-input to a fixed node. A method of obtaining the distance from a base station to a node may not be limited to the descriptions provided herein and various methods may be applied to obtain the distance.

According to an embodiment, a node belonging to a spatial group may generate a preamble signal. As illustrated in FIG. 2, the node 206 belonging to the third group may recognize the $d_3$ 205 of 0.9 km and the $r_3$ 209 of the third group based on the spatial group information received from the base station 201. In such an example, the node 206 may obtain a cyclic shift $N_{CS}(d_3)$ by substituting the $d_3$ 205 in Equation 3. Thus, the node 206 may generate a total of $$N_{PA}(d_3) = \left\lfloor \frac{N_{ZC}}{N_{CS}(d_3)} \right\rfloor$$

preambles by substituting the cyclic shift $N_{CS}(d_3)$ and the $r_3$ 209 in Equation 4. The node 206 may generate a $i\epsilon[0,N_{PA}(d_3)-1]$-th preamble as expressed in Equation 7.

$$z_{r_3,i}[n]=z_{r_3}[(n+N_{CS}(d_3)\times i) \bmod N_{ZC}], \quad n=0, \ldots, N_{ZC}-1, i\epsilon[0,N_{PA}(d_3)-1] \quad \text{[Equation 7]}$$

According to an embodiment, the base station may detect a preamble signal transmitted from a node. In the example 200 of FIG. 2, a receiver of the base station 201 may detect a received preamble based on K shifted reference ZC sequences, for example, $z_{r_1}[n+\tau_{B1}]$, $z_{r_2}[n+\tau_{B2}]$, ..., $z_{r_K}[n+\tau_{BK}]$. Group round-trip delay ($\tau_{Bk}$) required for the shifted reference ZC sequences may be obtained using Equation 8.

$$\tau_{B1} = 0, \tau_{BK} = \left\lceil \frac{20 \times \sum_{i=1}^{k-1} d_i}{3} \times \frac{N_{ZC}}{T_{SEQ}} - 0.5 \right\rceil, \quad \text{[Equation 8]}$$
$$k = 2, \ldots, K$$

In Equation 8, $\tau_{B1}$ denotes a non-existent round-trip delay unit: slot time corresponding to one sequence duration of the first group. $\tau_{Bk}$ denotes the round-trip delay between the base station 201 and the inner boundary of the k-th group. $N_{ZC}$ and $T_{SEQ}$ denote the ZC sequence length and duration (µs), respectively.

The shifted reference ZC sequences $z_{r_1}[n+\tau_{B1}]$, $z_{r_2}[n+\tau_{B2}]$, ..., $z_{r_K}[n+\tau_{BK}]$ may be reference sequences obtained by shifting reference ZC sequences $z_{r_1}[n]$, $z_{r_2}[n]$, ..., $z_{r_K}[n]$ by the round-trip delay between the base station 201 and the inner boundary of the k-th group. Each spatial group may generate preambles based solely on the corresponding group coverage distance in compensation for the round-trip delay between the base station 201 and the inner boundary of each spatial group.

According to an embodiment, in the random access method, the group coverage distance of a spatial group may be set to minimize the random access collision probabilities of nodes belonging to the spatial group and uniformly maintain the collision probabilities among spatial groups. For example, when K groups are present in a cell having a cell radius of d, the group coverage distance vector may be d=$[d_1, d_2, \ldots, d_3]$ and the random access collision probability of the k-th group may be expressed as Equation 9.

$$p_{c,k}(d) = 1 - \exp\left\{W\left(\ln\left(1 - \frac{1}{N_{PA}(d_k)}\right) \times \lambda \times T_{RACH} \times M_k(d)\right)\right\} \quad \text{[Equation 9]}$$

In Equation 9, $N_{PA}(d_k)$ denotes the number of available preambles in the k-th group. $\lambda(\sec^{-1})$ denotes the random access arrival rate of a node. $T_{RACH}$ denotes the physical random access channel (PRACH) time slot period. $M_k(d)$ denotes the number of nodes present in the k-th group. $W(x)$ is the Lambert W function and has a real number value within a range of $$x \geq -\frac{1}{e}.$$

An optimization problem may be formulated as Equation 10.

$$\underset{d}{\text{minimize}} \sum_{k=1}^{K} p_{c,k}(d) \quad \text{[Equation 10]}$$

subject to $|p_{c,k}(d) - p_{c,j}(d)| \leq \epsilon$, $k, j = 1, \ldots, K, k \neq j$ $d_1 + \ldots + d_K = d$ $d_k \geq d_{min}, k = 1, \ldots, K$ In Equation 10, $\epsilon$ denotes the constraint constant reflecting the fairness of collision probabilities among spatial groups. $d_{min}$ denotes the minimum group coverage distance satisfying $N_{PA}(d_k) \leq N_{PA}^{conv}$.

According to an embodiment, an overlapping among different group preamble identifier in a random access response message may be resolved using timing alignment information in the random access response message. In the random access response message of an OFDMA based cellular system, the number of preamble identifier bits is fixed. In the conventional random access method, preamble identifier ranging from 0 to $N_{PA}^{conv}-1$ may be used in the random access response message and the overlapping problem of the preamble identifier may not occur. However, in the spatial group based random access method, each spatial group may use the preamble identifier ranging from 0 to $N_{PA}^{conv}-1$ in the random access response message without a group identifier and, thus, the overlapping problem of preamble identifier may occur among different spatial groups. For example, a base station may transmit random access response messages having a preamble identifier "0" in response to both preamble "0" transmitted from the first group and preamble "0" transmitted from the second group.

In such an example, a node transmitting the preamble "0" may not distinguish which random access response message contains the corresponding preamble identifier for the node. According to an embodiment, each node may search for a correct random access response message sent to the node using timing alignment information in the random access response message. Each node belonging to a group region may distinguish the range of timing alignment information possessed by the group region based on Equation 11.

$$TA_k = \begin{cases} \left(0, \frac{20 \times d_1}{3}\right], & k = 1 \\ \left(\frac{20 \times \sum_{i=1}^{k-1} d_i}{3}, \frac{20 \times \sum_{i=1}^{k} d_i}{3}\right], & k = 2, 3, \ldots, K \end{cases} \quad \text{[Equation 11]}$$

In Equation 11, $TA_k$ denotes the timing alignment information to be applied to nodes belonging to the k-th group. Thus, each node may distinguish the corresponding random access response message for the node without an additional bit in the random access response message used to identify the corresponding spatial group.

Figure 3:
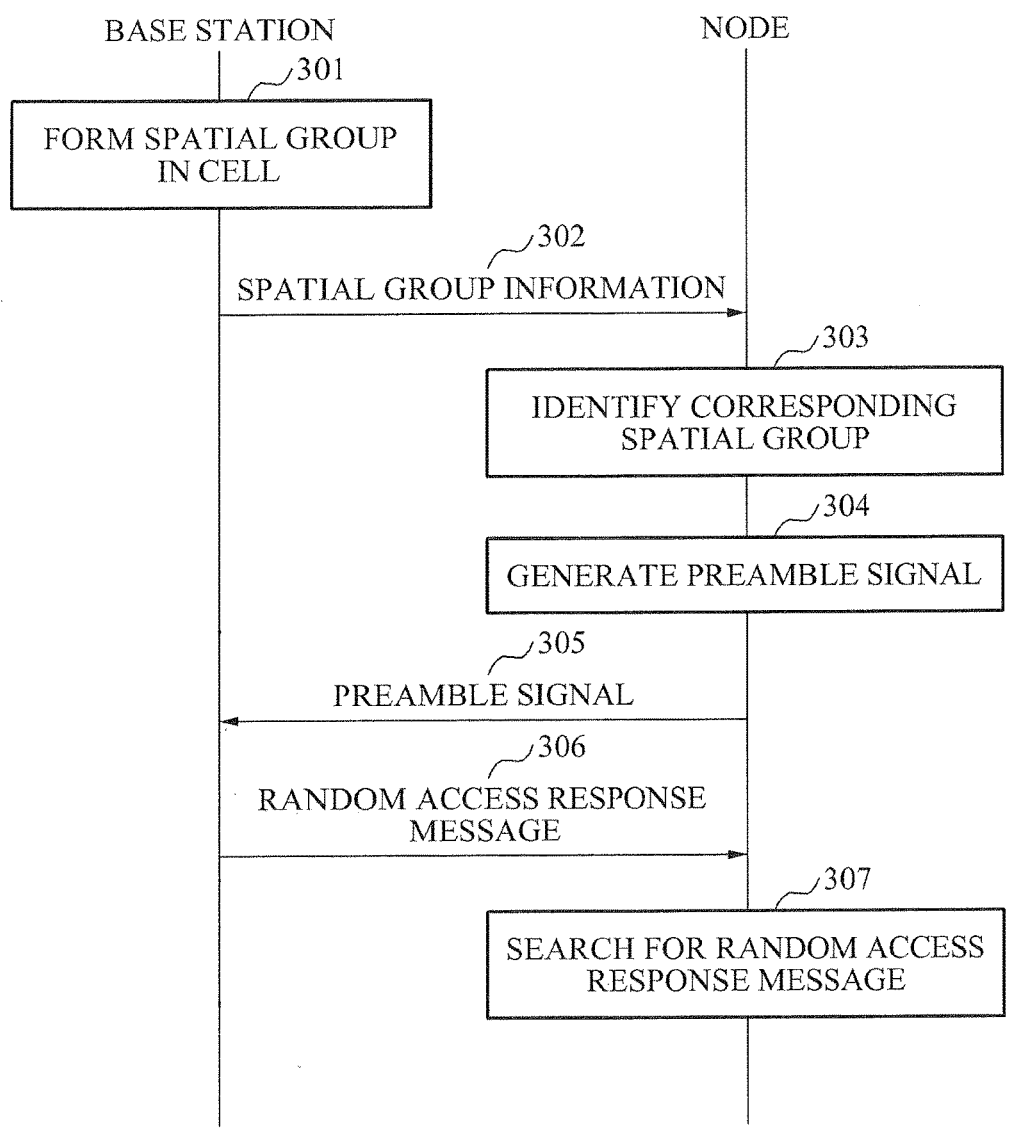
FIG. 3 is a flowchart illustrating a random access method of a system performing spatial group based random access according to an embodiment of the present invention.

FIG. 3 is a flowchart illustrating a random access method of a system performing spatial group based random access according to an embodiment of the present invention.

Referring to FIG. 3, in operation 301, a base station forms spatial groups in a cell based on the distance from the base station. the number of the spatial groups may be determined to be identical to the number of available root indices for the base station. In an example, the group coverage distance of a spatial group may be determined to minimize the random access collision probabilities of nodes belonging to the spatial group. In another example, the group coverage distance of the spatial group may be set to uniformly maintain the collision probabilities among the spatial groups.

In operation 302, the base station transmits spatial group information to nodes, for example, terminal devices. The spatial group information may include the group coverage distance and the root index of the corresponding spatial group. In operation 302, a node receives the spatial group information.

In operation 303, the node identifies the spatial group to which the node belongs based on the spatial group information. In an example, the node may receive a reference signal transmitted from the base station, estimate the distance from the base station based on the strength of the reference signal, and identify the spatial group to which the node belongs based on the received spatial group information.

In operation 304, the node generates a preamble signal. In an example, the random access preamble is generated from a ZC sequence by cyclically shifting the ZC sequence by an integer multiple of a cyclic shift.

In operation 305, the node transmits the generated preamble signal to the base station. The preamble signal may be transmitted during a predetermined length of an access slot, and the node may select one among multiple preambles during a predetermined initial length of the access slot and transmit the selected preamble signal. In operation 305, the base station receives the preamble signal from the node. In an example, the base station detects the preamble signal based on shifted reference ZC sequences. The shifted reference ZC sequences may refer to reference sequences shifted by the round-trip delay between the base station and the inner boundary of the corresponding spatial group.

In operation 306, the base station transmits a random access response message to the node. In an example, the base station may transmit the random access response message in response to the preamble signal received from the node. In operation 306, the node receives the random access response message. The node may search for its own random access response message for the node using timing alignment information in the random access response message. Here, each node belonging to a group region may distinguish the range of timing alignment information possessed by the group region.

In operation 307, the node searches for the random access response message corresponding to the node based on the preamble identifier and the timing alignment information in the random access response message. The searching for the random access response message may include searching for a random access response message in which the timing alignment information corresponds to the range of timing alignment information of the corresponding spatial group.

For example, when the node does not receive the random access response message within a predetermined number of times in response to the preamble signal, a neighboring spatial group located nearest to the node may be identified as the special group corresponding to the node.

Figure 4:
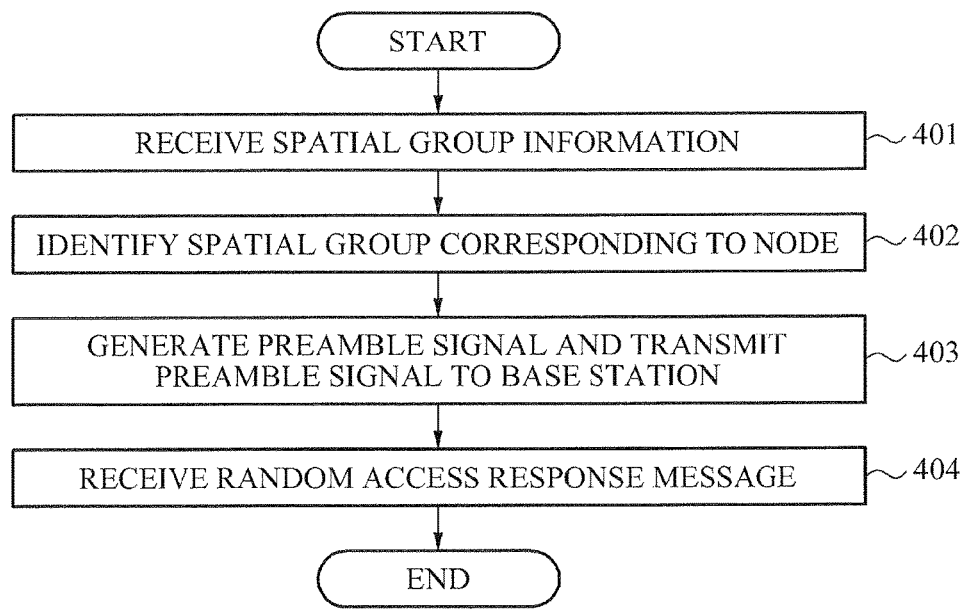
FIG. 4 is a flowchart illustrating a random access method of a node according to an embodiment of the present invention.

FIG. 4 is a flowchart illustrating a random access method of a node according to an embodiment of the present invention.

Referring to FIG. 4, in operation 401, the node receives spatial group information on spatial groups in a cell generated from a base station. The spatial groups in the cell may be generated by dividing the cell based on the distance from the base station.

In operation 402, the node identifies the spatial group to which the node belongs based on the spatial group information. The node may receive the reference signal transmitted from the base station of the cell and estimate the distance between the base station and the node based on the strength of the reference signal. Thus, the node may identify the spatial group to which the node belongs by analyzing the spatial group information received from the base station.

In operation 403, the node generates a preamble signal and transmits the preamble signal to the base station. The node may determine the cyclic shift using the group coverage distance of the spatial group. The group coverage distance may refer to the distance from the inner boundary of the spatial group to the outer boundary of the spatial group. The group coverage distance may be preset to minimize the random access collision probabilities in all spatial groups and uniformly maintain the collision probabilities among the spatial groups. The preamble signal may be generated using root indices allocated to the spatial groups and the cyclic shift.

In operation 404, the node receives a random access response message in response to the preamble signal. Here, preamble identifier may not be easily classified based on the spatial groups because the number of preamble identifier bits is fixed. In an example, the node may search for its own random access response message corresponding to the node based on the preamble identifier and the timing alignment information in the random access response message. The node may search for its own random access response message for the node by verifying whether the timing alignment information corresponds to the range of timing alignment information for the corresponding spatial group.

Figure 5:
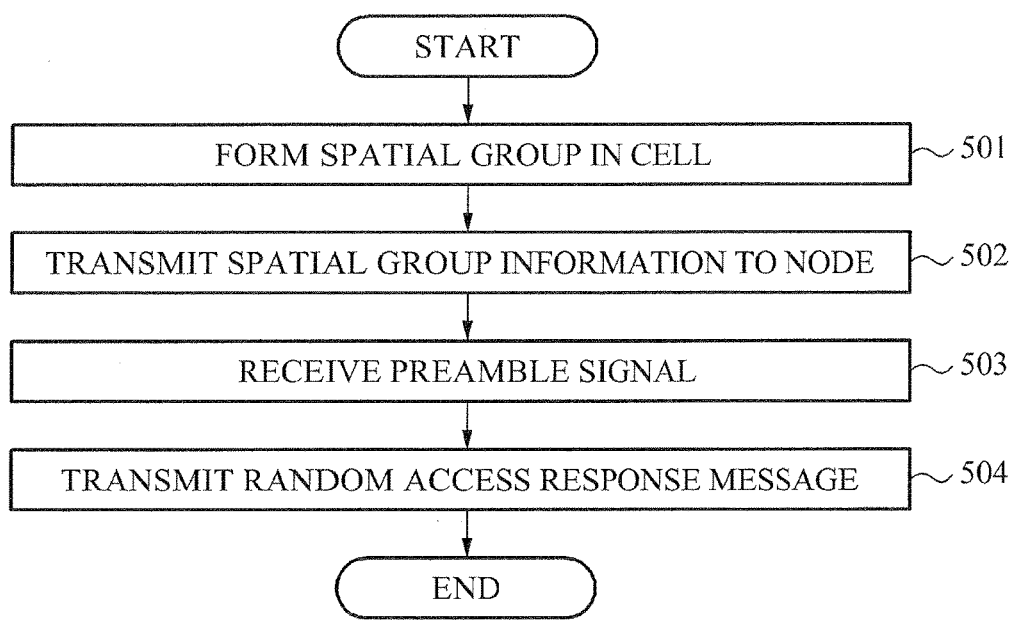
FIG. 5 is a flowchart illustrating a random access method of a base station according to an embodiment of the present invention.

FIG. 5 is a flowchart illustrating a random access method of a base station according to an embodiment of the present invention.

Referring to FIG. 5, in operation 501, the base station forms spatial groups in a cell. According to an embodiment, forming the spatial groups may increase the number of available preambles in the cell. The spatial groups may be classified based on the distance from the base station. the number of the spatial groups may be determined to be identical to the number of available root indices for the base station. According to another embodiment, the base station may set the group coverage distance of a spatial group to minimize the random access collision probabilities of nodes belonging to the spatial group and uniformly maintain the collision probabilities among the spatial groups.

In operation 502, the base station transmits spatial group information on the formed spatial groups. The spatial group information may include the group coverage distance and the root index of the spatial group.

In operation 503, the base station receives a preamble signal from the node. In an example, the base station receiver detects the preamble signal based on shifted reference ZC sequences. The shifted reference ZC sequences may refer to reference sequences shifted by the round-trip delay between the base station and the inner boundary of the spatial group.

In operation 504, the base station transmits a random access response message corresponding to the preamble signal.

Figure 6:
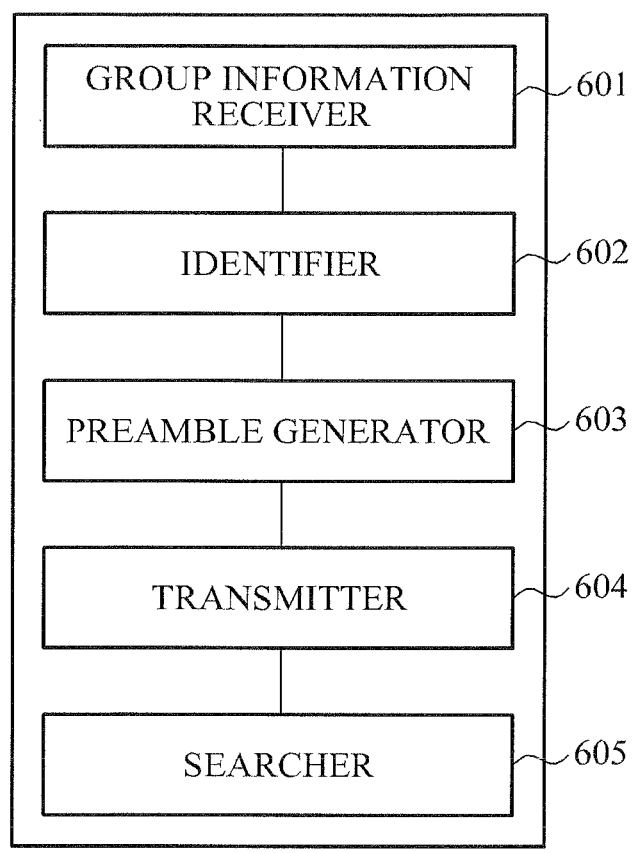
FIG. 6 is a diagram illustrating a configuration of a node performing a random access method according to an embodiment of the present invention.

FIG. 6 is a diagram illustrating a configuration of a node 600 performing a random access method according to an embodiment of the present invention.

Referring to FIG. 6, the node 600 includes a group information receiver 601, an identifier 602, a preamble generator 603, a transmitter 604, and a searcher 605.

The group information receiver 601 may receive spatial group information on spatial groups in a cell generated from a base station. The spatial groups in the cell may be generated by dividing the cell based on the distance from the base station.

The identifier 602 may identify a spatial group to which the node 600 belongs based on the spatial group information. The node 600 may receive the reference signal transmitted from the base station and estimate the distance between the node 600 and the base station based on the strength of the reference signal. Thus, the identifier 602 may identify the spatial group to which the node 600 belongs by analyzing the spatial group information received from the base station.

The preamble generator 603 may generate a preamble signal. The node 600 may determine a cyclic shift based on the group coverage distance of the spatial group. The group coverage distance may refer to the distance ranging from the inner boundary of the spatial group to the outer boundary of the spatial group. The group coverage distance may be preset to minimize the random access collision probabilities in all spatial groups and uniformly maintain the collision probabilities among the spatial groups. The preamble signal may be generated using a root index allocated to the spatial group and the cyclic shift.

The transmitter 604 may transmit the preamble signal generated by the preamble generator 603.

The searcher 605 may receive a random access response message in response to the preamble signal. Here, preamble identifier may not be easily classified based on the spatial groups because the number of preamble identifier bits is fixed. The searcher 605 may search for its own random access response message corresponding to the node 600 based on the preamble identifier and the timing alignment information in the random access response message. The searcher 605 may search for the random access response message for the node by verifying whether the timing alignment information corresponds to the range of timing alignment information for the spatial group. For example, when the searcher 605 does not receive an available random access response message within a predetermined number of times in response to the preamble signal, the identifier 602 may identify a neighboring spatial group located nearest to the node, in lieu of the identified spatial group, as the spatial group corresponding to the node.

Figure 7:
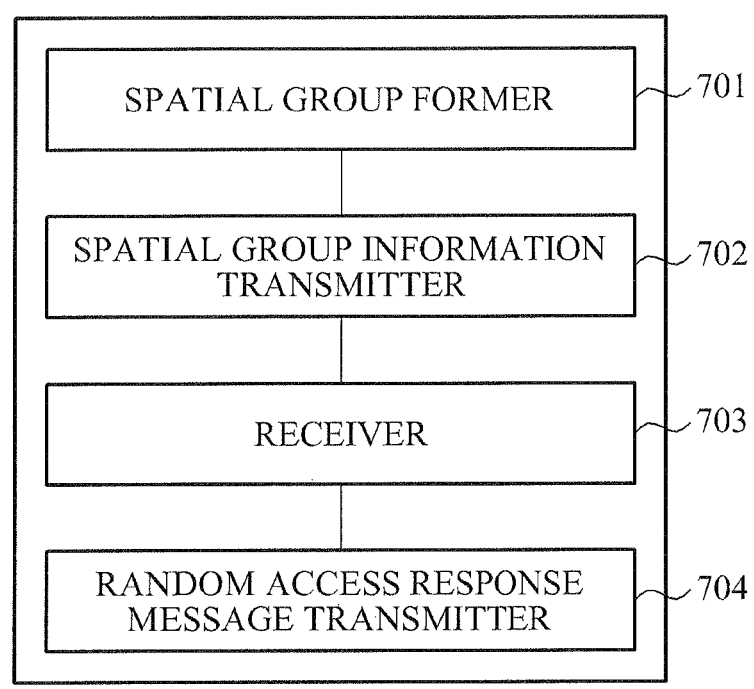
FIG. 7 is a diagram illustrating a configuration of a base station performing a random access method according to an embodiment of the present invention.

FIG. 7 is a diagram illustrating a configuration of a base station 700 performing a random access method according to an embodiment of the present invention.

Referring to FIG. 7, the base station 700 includes a spatial group former 701, a spatial group information transmitter 702, a receiver 703, and a random access response message transmitter 704.

The spatial group former 701 may form spatial groups in a cell. According to an embodiment, forming the spatial groups may increase the number of available preambles in the cell. The spatial groups may be classified based on the distance from the base station 700. the number of the spatial groups may be determined to be identical to the number of available root indices for the base station 700. The spatial group former 701 may set the group coverage distance of a spatial group to minimize the random access collision probabilities of nodes belonging to the spatial group and uniformly maintain the collision probabilities among the spatial groups.

The spatial group information transmitter 702 may transmit spatial group information on the formed spatial groups to a node in the cell. The spatial group information may include the group coverage distance and root indices. The node may identify a spatial group to which the node belongs using the spatial group information.

The receiver 703 may receive a preamble signal from the node.

The random access response message transmitter 704 may transmit a random access response message corresponding to the received preamble signal.

In comparison to the conventional random access method, using a spatial group based random access method may increase the number of smart meters that may be accommodated in the cell.

In one case in which cell radius is set to 2 km and another case in which cell radius is set to 4 km, smart meters are evenly distributed in a cell and a metering report period of "$1/\lambda$" is set to be 5 minutes. Here, the conventional random access method may set 58 preambles for human-to-human (H2H) communication and 6 preambles for machine-to-machine (M2M) communication to use among a total of 64 preambles. In the 2 km case, the spatial group based random access method may set group coverage distances, for example, $d_1$ to be 1.34 km and $d_2$ to be 0.66 km. Thus, the spatial group based random access method may use a total of 113 preambles based on $N_{PA}(d_1)=49$ and $N_{PA}(d_2)=64$. Among the 113 preambles, the spatial group based random access method may set 58 preambles for the H2H communication and 55 preambles for the M2M communication to use.

In the 4 km case, the spatial group random access method may set group coverage distances, for example, $d_1$ to be 2.02 km, $d_2$ to be 1.07 km, and $d_3$ to be 0.91 km. Thus, the spatial group based random access method may use a total of 149 preambles based on $N_{PA}(d_1)=38$, $N_{PA}(d_2)=52$, and $N_{PA}(d_3)$ =59. Among the 149 preambles, the spatial group based random access method may set 58 preambles for the H2H communication and 91 preambles for the M2M communication to use.

Figure 8:
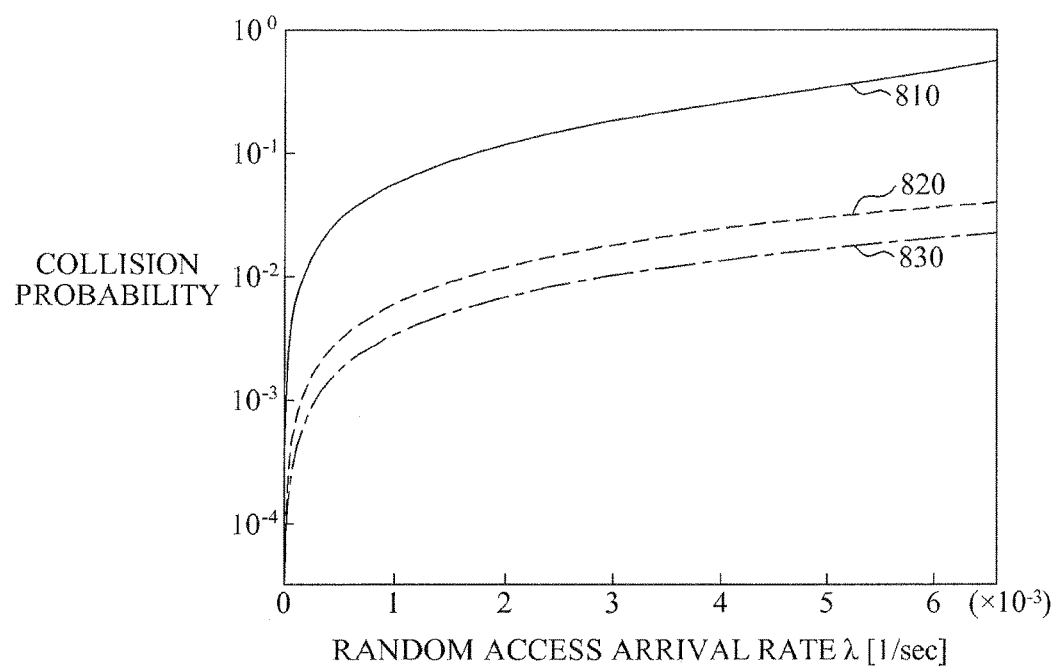
FIGS. 8 and 9 are graphs illustrating the effect obtained through spatial group based random access according to an embodiment of the present invention.
Figure 9:
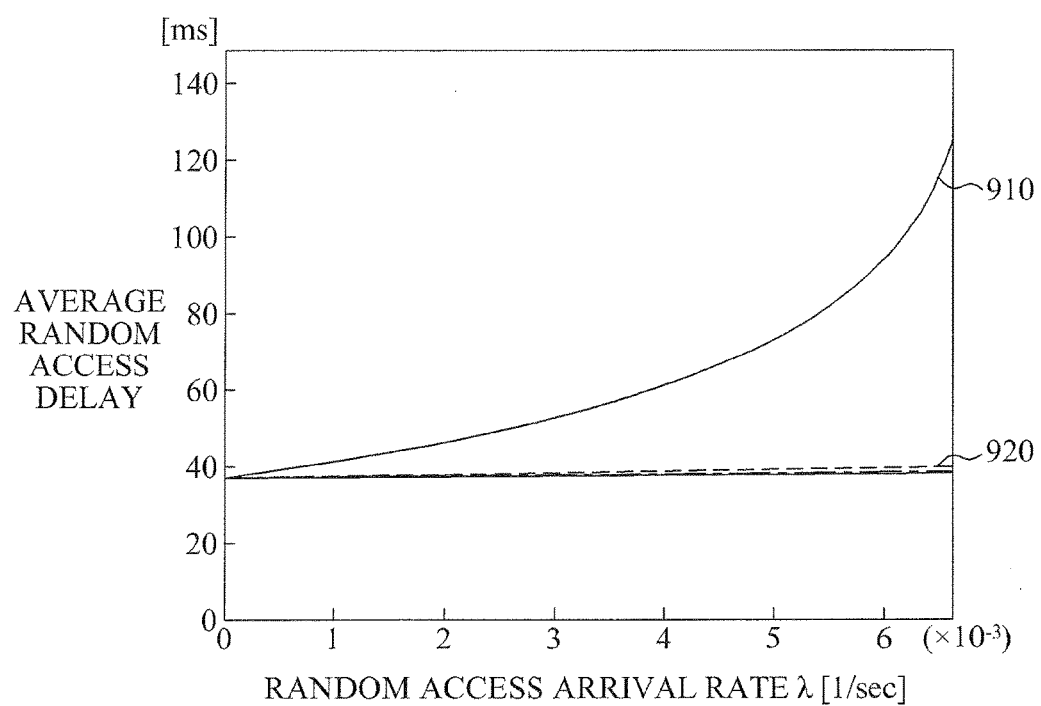

FIGS. 8 and 9 are graphs illustrating an effect obtained through spatial group based random access according to an embodiment of the present invention.

FIG. 8 illustrates a graph indicating the difference in collision probabilities between the conventional random access method and the proposed spatial group based random access method when a total number of nodes is 30,000. Referring to FIG. 8, when a metering report period of "1/λ" is 3 minutes, a case 810 of the conventional random access method shows an approximate collision probability of 39%. However, in the spatial group based random access method, a case 820 of a radius of 2 km from the base station shows an approximate collision probability of 3%. In addition, a case 830 of a radius of 4 km from the base station shows an approximate collision probability of 2%. Referring to the graph of FIG. 8, the case 830 of the radius 4 km has a lower collision probability than the case 820 of the radius 2 km, which may result from using 33 more preambles by using one more root indices.

FIG. 9 illustrates a graph indicating the average random access delay based on a channel environment. Referring to FIG. 9, a case 920 of the spatial group based random access method shows a mostly constant average random access delay despite an increase in the random access arrival rate. Conversely, a case 910 of the conventional random access method shows random access delays that increase exponentially when the random access arrival rate increases. In the graph of FIG. 9, a portion in which the random access delay is saturated in the case 910 of the conventional random access method may indicate that random access does not succeed until a maximum number of times of attempting random access is reached and the random access delay infinitely increases.

Table 1 indicates the acceptable number of smart meters in three target collision probabilities when a metering report period of 1/λ is 5 minutes.

TABLE 1

| Target Collision Probability | Conventional | Spatial Group Based Random Access 2 km | Spatial Group Based Random Access 4 km |
|---|---|---|---|
| 0.1% | 170 | 1,500 | 2,600 |
| 1% | 1,700 | 15,000 | 26,000 |
| 3% | 4,900 | 44,500 | 78,200 |

Referring to Table 1, when the collision probability is 3%, the spatial group based random access method may accommodate 44,500 smart meters within a 2 km cell, and 78,200 smart meters within a 4 km cell. However, the conventional method may accommodate merely 4,900 smart meters.

Thus, the spatial group based random access method may accommodate a greater number of smart meters with lower collision probabilities.

Figure 10:
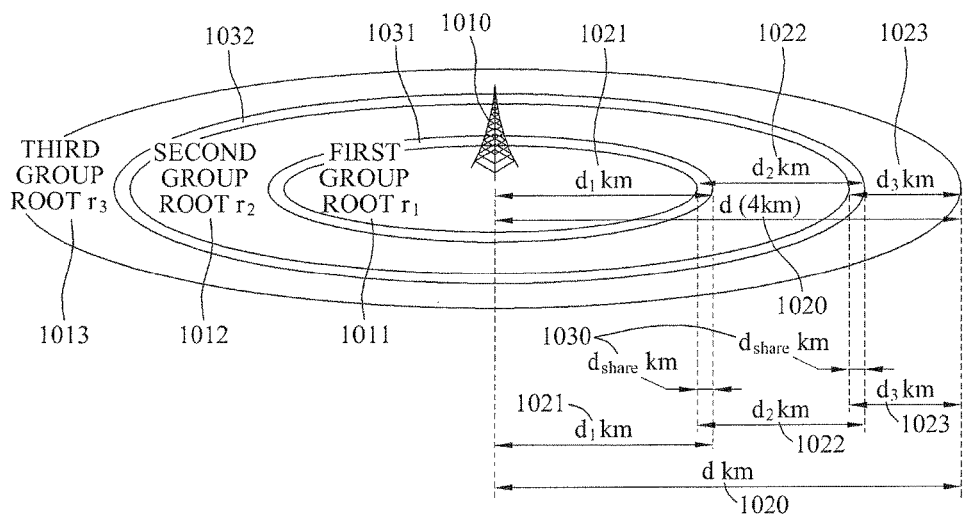
FIG. 10 is a diagram illustrating a shared area of spatial groups in a spatial group based random access method according to an embodiment of the present invention.

FIG. 10 is a diagram illustrating a shared area of spatial groups in a spatial group based random access method according to an embodiment of the present invention.

In the spatial group based random access method, a node may identify a spatial group to which the node belongs based on spatial group information received from a base station and information on the distance between the node and the base station. However, an error may occur when the node estimates the distance between the node and the base station. For example, when the node erroneously identifies the spatial group due to the estimation error on the distance, the node may suffer from a random access disruption. Accordingly, the node that erroneously identifies the spatial group may not receive a random access response message after transmitting a preamble signal. To prevent the node from continuously failing in receiving the random access response message, the node may identify a neighboring spatial group located nearest to the node as the spatial group corresponding to the node when the random access response message is not received within a predetermined number of times in response to the preamble signal. For example, when the node does not receive the random access response message N times, the spatial group including the node may be modified to the neighboring spatial group located nearest to the node.

When the distance between the node and the base station estimated by the node is $\hat{D}$, $\hat{D}$ may be represented as Equation 12.

$$\hat{D} = D + D_e \quad \text{[Equation 12]}$$

In Equation 12, D and $D_e$ denote the actual distance between the node and the base station, and the distance estimation error, respectively.

That is, spatial groups in a cell may include a shared area in which two neighboring spatial groups among the spatial groups overlap within the shared distance. Referring to FIG. 10, the first group 1011 may be a round shaped region with distance $d_1$ 1021 from a base station 1010. The first group 1011 may include a shared area 1031. the second group 1012 may be a doughnut shaped region with distance $d_2$ 1022 from the first group 1011. The second group 1012 may include the shared areas 1031 and 1032. Similarly, the third group 1013 may be a doughnut shaped region with distance $d_3$ 1023 from the second group 1012. The third group 1013 may include the shared area 1032. That is, the first group 1011 and the second group 1012 may share the shared area 1031, and the second group 1012 and the third group 1013 may share the shared area 1032. In such an example, the shared distance 1030 of the shared areas may be 100 meters (m).

In addition, FIG. 10 illustrates a cell model including the shared areas in the spatial group based random access method. Referring to FIG. 10, a cell radius of a region to which the base station 1010 provides a service is "d" 1020. In an example, when the d 1020 is 4 km, the base station 1010 may determine the total number K of spatial groups to be 3 based on the d of 4 km. The d of 4 km may be divided into the first group 1011, the second group 1012, and the third group 1013 based on group coverage distances, for example, $d_1$ 1021, $d_2$ 1022, and $d_3$ 1023. The group coverage distances may be set to overlap within the shared distance 1030. The base station 1010 may allocate each of three root indices to the groups. For example, the base station 1010 may allocate root index $r_1$ to the first group 1011, root index $r_2$ to the second group 1012, and root index $r_3$ to the third group 1013. The base station 1010 may broadcast, to all nodes in the cell, the group coverage distances $d_1$ 1021, $d_2$ 1022, and $d_3$ 1023 and information on the root indices $r_1$, $r_2$, and $r_3$. In such an example, the node may be a terminal device or a communication processor.

According to an embodiment, a node may estimate distance from a base station based on the strength of a reference signal transmitted from the base station. As illustrated in FIG. 10, the node may recognize the group coverage distances $d_1$ 1021, $d_2$ 1022, and $d_3$ 1023 and the information on the root indices $r_1$, $r_2$, and $r_3$. The node may recognize a spatial group to which the node belongs based on the group coverage distance of the spatial group. The node may estimate the distance from the base station 1010 based on the strength of the reference signal transmitted from the base station 1010, and identify the spatial group to which the node belongs using the estimated distance and the received spatial group information. In an example, the distance from the base station 1010 to the node may be obtained using a GPS. In another example, the distance from the base station 1010 to the node may be obtained using the distance information pre-input to a fixed node. A method of obtaining the distance from the base station to the node may not be limited to the descriptions provided in the foregoing and various methods may be applied to obtain the distance.

Although the node fails to identify the spatial group to which the node belongs due to the distance estimation error $D_e$, the node in the shared areas 1031 and 1032 may perform random access without a problem by setting the shared distance 1030.

Figure 11:
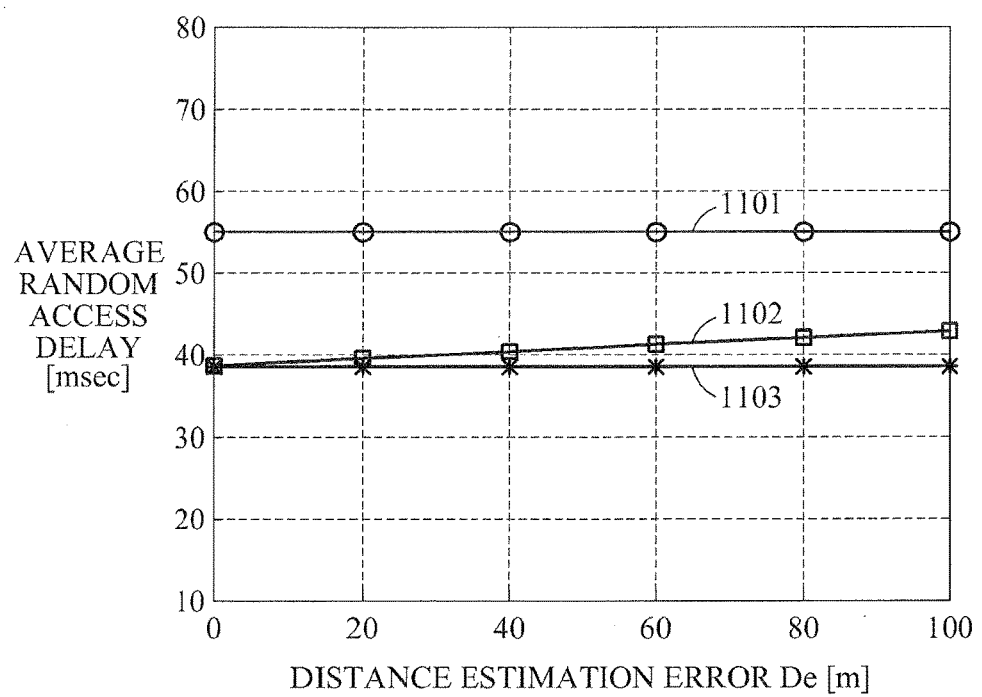

FIGS. 11 and 12 are graphs illustrating the effect of distance estimation error $D_e$ on the average random access delay according to an embodiment of the present invention.

The distance estimation error $D_e$ between a node and a base station is based on normal distribution $D_e \sim N(0,\sigma_e^2)$. For example, when a cell radius of d is 2 km, a random access rate of $$\frac{1}{\lambda}$$

is 5 minutes, the total number of nodes is 30,000, and the maximum number of random access attempts in the same group, N, is 3, the collision probabilities and random access delays may be evaluated by increasing the distance estimation error $D_e$.

Referring to FIG. 11, the effect of the distance estimation errors obtained through spatial group based random access on the average random access delay is verified when the shared spatial group is not set. A case 1101 of the conventional random access shows a constant random access delay irrespective of a distance estimation error $D_e$. A case 1102 of a node belonging to the first group increases random access delay when the distance estimation error $D_e$ increases. However, a case 1103 of a node belonging to the second group shows a constant random access delay irrespective of the distance estimation error $D_e$.

Referring to FIG. 12, the effect of distance estimation errors obtained through spatial group based random access on the average random access delay is verified when a shared spatial group is set. A case 1201 of the conventional random access shows a constant random access delay irrespective of the distance estimation error $D_e$. A case 1202 of a node belonging to the first group and a case 1203 of a node belonging to the second group also shows a constant random access delay irrespective of the distance estimation error $D_e$. As illustrated in the foregoing, using the spatial group based random access method by setting the shared spatial group may not result in degradation in performance despite an occurrence of the distance estimation error $D_e$.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as floptical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A random access method of a node, the method comprising the following steps performed by the node:

receiving, from a base station, spatial group information on spatial groups in a cell generated based on a distance from the base station;

identifying a spatial group corresponding to the node based on the spatial group information;

transmitting a preamble signal requesting initial network access from the node to the base station by generating the preamble signal based on a cyclic shift and a root index corresponding to the received spatial group information; and receiving a random access response message in response to the preamble signal by searching for a random access response message corresponding to the node based on a preamble identifier and timing alignment information comprised in the random access response message, wherein the timing alignment information corresponds to a range of timing alignment information for the spatial group, and wherein the node distinguishes the range of timing alignment information possessed by the spatial group based on equation 11, wherein equation 11 is:

$$TA_k = \begin{cases} \left(0, \dfrac{20 \times d_1}{3}\right], & k = 1 \\ \left(\dfrac{20 \times \sum_{i=1}^{k-1} d_i}{3}, \dfrac{20 \times \sum_{i=1}^{k} d_i}{3}\right], & k = 2, 3, \ldots, K \end{cases}$$

wherein $TA_k$ denotes the timing alignment information to be applied to nodes belonging to the k-th group and d denotes a group coverage distance.

2. The method of claim 1, wherein the generating of the preamble signal comprises:
determining the cyclic shift using the group coverage distance of the spatial group based on a equation 3 wherein the equation 3 is $$N_{CS}(d) = \left\lceil \left(\frac{20}{3}d + \tau_{ds}\right)\frac{N_{ZC}}{T_{SEQ}}\right\rceil + n_g,$$

and
d denotes the group coverage distance and $N_{ZC}$ denotes a ZC (Zadoff Chu) sequence length and $T_{SEQ}$ denotes duration and $\tau_{ds}$ denotes a maximum delay spread and $n_g$ denotes the number of additional guard samples.

3. The method of claim 1, wherein the spatial groups in the cell comprise a shared area in which two neighboring spatial groups among the spatial groups overlap within a shared distance.

4. The method of claim 1, wherein the identifying of the spatial group corresponding to the node comprises:
receiving a reference signal transmitted from the base station of the cell;
estimating the distance from the base station to the node based on the strength of the reference signal; and
identifying information on the spatial group corresponding to the node from the spatial group information received from the base station.

5. The method of claim 1, wherein the generating of the preamble signal comprises:
determining the cyclic shift using a group coverage distance of the spatial group; and
generating the preamble signal using the root index allocated to the spatial group and the cyclic shift.

6. The method of claim 1, wherein the receiving of the random access response message comprises:
identifying, as the spatial group corresponding to the node, a neighboring spatial group located nearest to the node when the random access response message is not received within a predetermined number of times in response to the preamble signal.

7. A random access method of a base station, the method comprising the following steps performed by the base station:
forming spatial groups in a cell of the base station based on a distance from the base station;
transmitting spatial group information on the formed spatial groups to a node;
receiving a preamble signal requesting initial network access from the node to the base station; and
transmitting a random access response message in response to the preamble signal, wherein the random access response message corresponds to the node based on a preamble identifier and timing alignment information comprised in the random access response message, wherein the timing alignment information corresponds to a range of timing alignment information for the spatial group, and wherein the node distinguishes the range of timing alignment information possessed by the spatial group based on equation 11, wherein equation 11 is:

$$TA_k = \begin{cases} \left(0, \frac{20 \times d_1}{3}\right], & k = 1 \\ \left(\frac{20 \times \sum_{i=1}^{k-1} d_i}{3}, \frac{20 \times \sum_{i=1}^{k} d_i}{3}\right], & k = 2, 3, \ldots, K \end{cases}$$

wherein $TA_k$ denotes the timing alignment information to be applied to nodes belonging to the k-th group and d denotes a group coverage distance.

8. The method of claim 7, wherein the spatial groups in the cell comprise a shared area in which two neighboring spatial groups among the spatial groups overlap within the shared distance.

9. The method of claim 7, wherein the forming of the spatial groups in the cell comprises:
determining the number of the spatial groups to be identical to the number of available root indices for the base station; and
setting the group coverage distance of a spatial group to minimize the random access collision probabilities of nodes comprised in the spatial group and uniformly maintain the collision probabilities among the spatial groups.

10. The method of claim 7, wherein the spatial group information comprises:
a group coverage distance and a root index of the spatial group.

11. A node performing a random access method, the node comprising:
a group information receiver to receive spatial group information on spatial groups in a cell formed from a base station;
an identifier component to identify a spatial group corresponding to the node;
a preamble generator to generate a preamble signal based on a cyclic shift and a root index corresponding to the received spatial group information;
a transmitter to transmit the generated preamble signal requesting initial network access from the node to the base station; and
a searcher component to search for an available random access response message in response to the preamble signal, wherein the random access response message corresponds to the node based on a preamble identifier and timing alignment information comprised in the random access response message, wherein the timing alignment information corresponds to a range of timing alignment information for the spatial group, and wherein the node distinguishes the range of timing alignment information possessed by the spatial group based on equation 11, wherein equation 11 is:

$$TA_k = \begin{cases} \left(0, \frac{20 \times d_1}{3}\right], & k = 1 \\ \left(\frac{20 \times \sum_{i=1}^{k-1} d_i}{3}, \frac{20 \times \sum_{i=1}^{k} d_i}{3}\right], & k = 2, 3, \ldots, K \end{cases}$$

wherein $TA_k$ denotes the timing alignment information to be applied to nodes belonging to the k-th group and d denotes a group coverage distance.

12. The node of claim 11, wherein the identifier component identifies information on a spatial group corresponding to the node from the spatial group information received from the base station by receiving the reference signal transmitted from the base station of the cell and estimating the distance from the base station to the node based on the strength of the reference signal.

13. The node of claim 11, wherein the preamble generator generates the preamble signal by determining the cyclic shift using the group coverage distance of the spatial group and by using the root index allocated to the spatial group and the cyclic shift.

14. The node of claim 11, wherein, when the available random access response message is not received within a predetermined number of times in response to the preamble signal, the identifier component identifies, as the spatial group corresponding to the node, a neighboring spatial group located nearest to the node in lieu of the spatial group identified by the identifier component.

15. The node of claim 11, wherein the searcher component searches for a random access response message corresponding to the node using a preamble identifier and timing alignment information comprised in the random access response message.

16. A base station performing a random access method with a node, the base station comprising:
   a spatial group former component to form spatial groups in a cell of the base station;
   a spatial group information transmitter to transmit spatial group information on the formed spatial groups to the node;
   a receiver to receive a preamble signal requesting initial network access from the node to the base station; and
   a random access response message transmitter to transmit a random access response message in response to the preamble signal, wherein the random access response message corresponds to the node based on a preamble identifier and timing alignment information comprised in the random access response message, wherein the timing alignment information corresponds to a range of timing alignment information for the spatial group, and wherein the node distinguishes the range of timing alignment information possessed by the spatial group based on equation 11, wherein equation 11 is:

$$TA_k = \begin{cases} \left(0, \dfrac{20 \times d_1}{3}\right], & k = 1 \\ \left(\dfrac{20 \times \sum_{i=1}^{k-1} d_i}{3}, \dfrac{20 \times \sum_{i=1}^{k} d_i}{3}\right], & k = 2, 3, \ldots, K \end{cases}$$

wherein $TA_k$ denotes the timing alignment information to be applied to nodes belonging to the k-th group and d denotes a group coverage distance.

* * * * *